Nov. 20, 1951     C. M. PERKINS, SR., ET AL     2,575,890

AUTOMATIC APPROACH CONTROL SYSTEM

Filed Oct. 17, 1947     3 Sheets-Sheet 3

*Fig. 3*

INVENTORS
CORLES M. PERKINS
ALFRED BENNETT
BY
ATTORNEY

Patented Nov. 20, 1951

2,575,890

UNITED STATES PATENT OFFICE 2,575,890

AUTOMATIC APPROACH CONTROL SYSTEM

Corles Melvin Perkins, Sr., Rutherford, N. J., and Alfred Bennett, Bronx, N. Y., assignors to Bendix Aviation Corporation, Teterboro, N. J., a corporation of Delaware Application October 17, 1947, Serial No. 780,332

33 Claims. (Cl. 343—117)

The present invention relates generally to the control of aircraft in attitude and direction and more particularly to a novel apparatus for automatically guiding an aircraft in the horizontal and/or vertical planes to a desired landing field or runway in accordance with radio beams transmitted from the field.

Systems, heretofore known, of this general character usually employ at the radio receiver output a cross pointer indicator which consists of a normally vertical localizer pointer and a normally horizontal glide path pointer, where course and attitude errors appear, respectively, as direct current voltages across the coil terminals of the two pointers. These voltages are utilized to define the flight path of the craft in the horizontal plane as called for by the localizer flight path signals and in the vertical plane as called for by the glide flight path signals.

The information received from the radio beams of the instrument landing system is angular in character; in other words, an indication of the number of degrees subtended between a line from the center of the aircraft and the axis of the beam. For a given angular indication, the actual distance from the axis of the beam decreases as the craft approaches the transmitter. An automatic approach system of the character disclosed by pending application Serial No. 705,524, filed October 25, 1946, is insensitive to this changing sensitivity, the system operating on an integration principle which is responsive only to the direction of displacement from the beam axis and the length of time that the aircraft has been displaced from the beam axis. However, in actual flights, it has been found desirable to add to the aforementioned automatic approach control system, especially for flight in the horizontal plane, a signal proportional to the angular displacement of the aircraft from the beam.

However, before such an angular displacement signal can be utilized for the proper operation of the aforementioned automatic approach system, it is necessary to overcome some of the inherent difficulties surrounding the use of such a signal whether it be used with the aforementioned approach system or with any other approach system. For example, by utilizing the latter signal without any modification or control thereof, too rapid and a possibly dangerous response on the part of the system to sudden changes in beam direction may occur, which may be caused by the aircraft taxiing in front of the transmitter or by passing over the transmitter. Moreover, when the aircraft is some distance out from the axis of the beam and the automatic approach control system is engaged at that point, the initial displacement signal will be excessive for proper operation of the system. Furthermore, as the distance of the aircraft varies relative to the radio transmitter, the sensitivity of the signal will likewise vary.

It is an object of the present invention, therefore, to provide a novel automatic radio approach control system utilizing a displacement signal wherein all of the disadvantages previously encountered with the use of such a signal have been eliminated.

Another object of the present invention is to provide a novel automatic radio approach and/or landing system for aircraft.

A further object is to provide a novel control for mobile craft whereby automatic approach to a desired destination in response to radio beams of existing instrument approach and landing systems is secured.

Another object is to provide a novel automatic approach control system for aircraft for directing the craft automatically toward and onto a desired runway, the system being responsive to the magnitude, polarity and time of persistence of the incoming radio signal.

Still another object of the present invention is to provide a novel automatic approach control system for aircraft for directing the craft automatically toward and onto a desired radio beam, the system being responsive to the magnitude, polarity and time of persistence of the incoming radio signal.

A further object of the present invention is to provide a novel automatic approach control system for aircraft for automatically maintaining the flight of the latter along a desired radio beam.

A still further object of the present invention is to provide a novel automatic approach system for aircraft which in response to radio beams creates two signals, i. e., one proportional to the angular displacement between the axis of the radio beam and the aircraft and the second proportional to the length of time that the aircraft is displaced from the axis of the beam, both signals being responsive to the direction of displacement from the beam.

Another objective of the present invention is to provide a novel automatic approach system for aircraft whereby an angular displacement signal is made usable in view of the limitations listed above.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only, and are not to be construed as defining the limits of the invention.

In the drawings, wherein like reference numerals refer to like parts:

Figure 3 is a wiring diagram of the relay control system of the localizer flight path computer of the noval automatic approach control system of the present invention.

The novel automatic approach control system of the present invention is designed to operate with conventional localizer and glide flight path transmitters located at an airport to which the craft is heading. The localizer flight path transmitter is generally located at the far end of the runway and radiates a radio pattern consisting of two overlapping lobes, one of the lobes being modulated at a frequency of 90 cycles and so arranged as to represent the left hand field of the localizer pattern and the other of the lobes being modulated at a frequency of 150 cycles so arranged as to represent the right hand field of the localizer pattern. A line drawn through the center of the overlaps of each pair of lobes defines an imaginary straight line down the center of the runway and out into space for some distance. The glide flight path transmitter, like the localizer transmitter, radiates a radio pattern consisting of two overlapping lobes modulated in a manner similar to the localizer except that the glide path lobes are stacked in a manner to provide vertical guidance of the craft, that is, a line drawn through the center of the overlaps of each pair of the latter lobes will define an imaginary straight and inclined line out into space from the runway.

Figure 1:
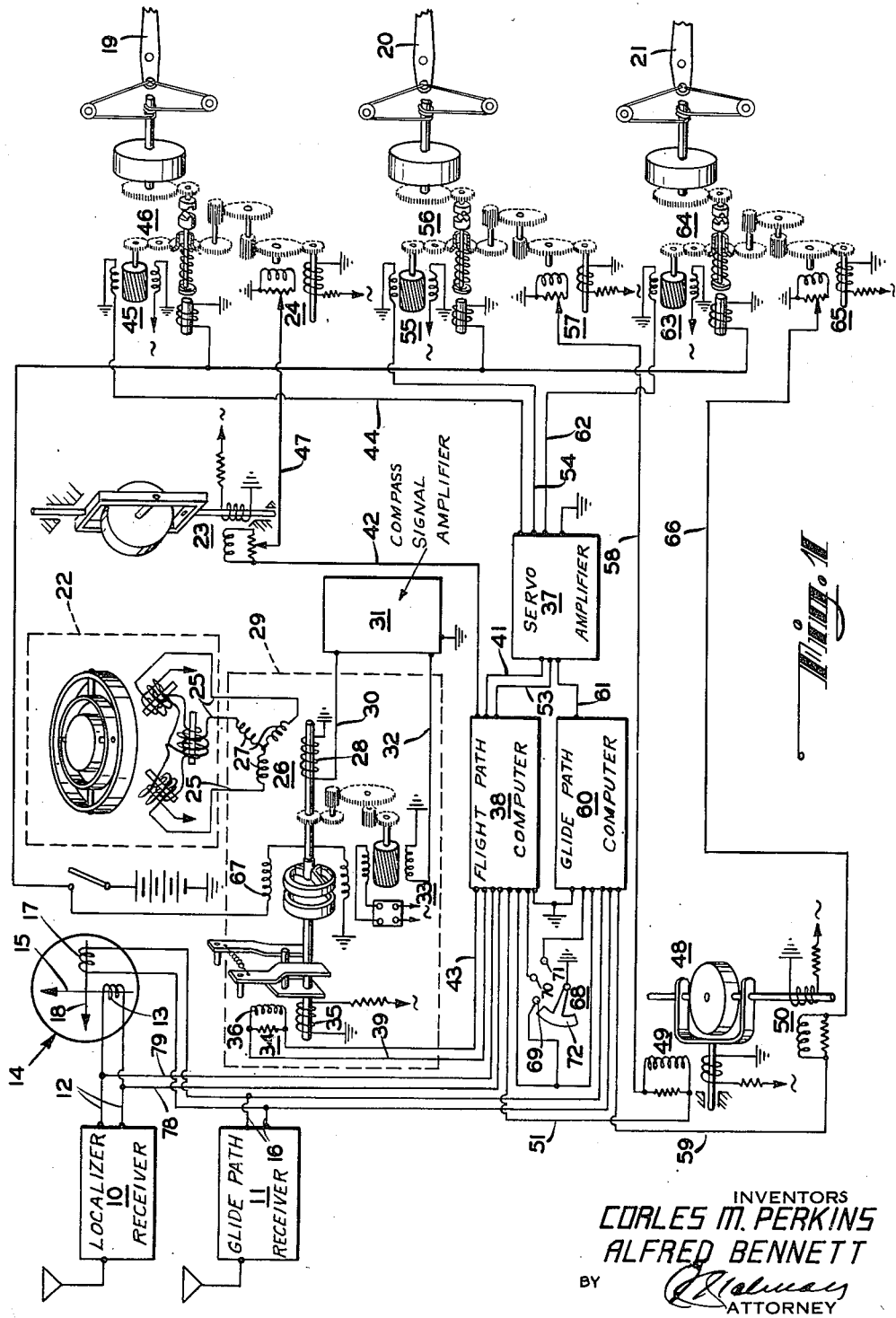
Figure 1 is a diagrammatic illustration of an electric automatic steering system for mobile craft embodying the novel automatic approach control system of the present invention.

For guiding an aircraft to the landing field in accordance with both the localizer and glide flight path beams, conventional radio receivers, designated generally with the reference characters 10 and 11 in Figure 1 of the drawings, are installed in the craft, the former receiving the lateral guidance signals from the localizer flight path transmitter and the latter receiving the vertical guidance signals from the glide flight path transmitter. In a known manner, receiver 10 develops at its output a direct current potential whose magnitude is proportional to the angular displacement of the aircraft from the localizer flight path beam and whose polarity is determined by the direction of displacement from the localizer beam. The direct current potential developed at the output of radio receiver 10 is impressed by means of leads 12 upon coil 13 of a conventional cross pointer indicator 14 to energize the coil. Due to the energization of coil 13 a vertical pointer 15, inductively coupled therewith is deflected, in a clockwise direction from a normally vertical position when the craft is to the left of the localizer flight path beam and in a counterclockwise direction when the craft is to the right of the localizer flight path beam, it being understood that pointer 15 maintains a normally vertical position when the craft is directly on the localizer flight path beam, at which position the potential impressed across coil 13 drops to a null.

In a similar manner, radio receiver 11 develops at its output a direct current potential, whose magnitude is proportional to the angular displacement of the aircraft from the glide flight path beam, and whose polarity is determined by the direction of displacement from the glide beam. The direct current potential developed at the output of radio receiver 11 is impressed by means of leads 16 upon a coil 17 of cross pointer indicator 14 to energize the latter coil. Due to the energization of coil 17 a horizontal pointer 18, inductively coupled therewith, is deflected upward from its normally horizontal position when the craft is below the glide flight path beam and downward when the craft is above the latter beam, it being understood that pointer 17 maintains a normally horizontal position when the craft is directly on the glide flight path beam at which position the potential impressed across coil 17 is a null. So long as both pointers 15 and 18 maintain their normal center positions as illustrated in Figure 1, no potential is impressed upon either coil 15 or 17 and the pilot will be advised that the craft is headed on the localizer flight path beam and down the glide flight path beam.

Coming now to the novel automatic control system of the present invention, the limitations inherent in known displacement control systems have been eliminated by making the system also sensitive to the craft direction of displacement and the length of time that the craft is away from one or the other or both of the beam axes. The signals developed in the system of the present invention for operating the craft control surfaces are not only a function of the angle of craft displacement from the axes of the beams but also depend upon the polarity of the radio signals received during the displacement and upon the time of persistence thereof.

Referring now to Figure 1 of the drawings, the novel range and automatic approach control system hereof is illustrated in a general manner, for a better understanding of the present invention in its cooperative association with an all electric automatic pilot, which may be of the character described and claimed in copending application Serial No. 516,488, filed December 31, 1943, the automatic pilot normally controlling craft rudder, aileron and elevator surfaces 19, 20 and 21, respectively.

As more fully described in aforementioned pending application Serial No. 516,488, the control of rudder 19 as shown in Figure 1, is derived from a gyro-stabilized earth inductor type compass 22, a rate of turn gyro take-off 23 and a follow-back device 24. Compass 22 develops a signal proportional to the amount of angular displacement of the craft from a prescribed heading which is fed by means of leads 25 into stator winding 27 of an inductive device 26, located within a master direction indicator 29, to induce within a rotor winding 28 of the inductive device, a directional displacement signal potential which is applied by means of lead 30 to the input of a vacuum tube amplifier 31. The output of amplifier 31 by means of a lead 32 energizes a motor 33 which not only operates to return rotor winding 28 of inductive device 26 to a null but also to rotate a rotor winding 35 of a signal transmitter 34 to reproduce the directional displacement signal potential within a stator winding 36 thereof. The directional displacement signal potential reproduced within stator winding 36 of signal transmitter 34 is communicated to the rudder channel input of a servo amplifier 37 through a flight path computer unit 38 by means of a lead 39, an armature 40E engaged with a fixed contact 40F of a relay 40, (Figure 3), located within unit 38, and a lead 41.

Fed into the input of the rudder channel of servo amplifier 37 in series with the directional displacement signal is a rate of turn signal which is developed by the rate of turn gyro take-off 23, the latter being connected in series with stator winding 36 of signal transmitter 34 by means of a lead 42, a fixed contact 40C engaged with armature 40B of relay 40 (Fig. 3) and a lead 43. The output of the rudder channel of servo amplifier 37 by means of lead 44 energizes a rudder servomotor 45 to displace rudder 19 through a speed reduction gear system 46 to return the craft to its prescribed course and at the same time operates inductive follow-up device 24 which develops an electrical follow-up signal that is fed into the input of the rudder channel of servo amplifier 37 in series with the directional displacement and rate of turn signals by means of a lead 47.

For craft attitude control, a horizon gyro 48 is provided having bank and pitch take-offs 49 and 50, respectively, the former having an electrical signal developed therein in response to craft bank, which is fed to the aileron channel input of amplifier 37 through flight path computer unit 38 by means of a lead 51, armatures 52B and 52E which engage with interconnected fixed contacts 52C and 52F, respectively, of a relay 52 (Fig. 3) and a lead 53. The output of the aileron channel of servo amplifier 37, by means of a lead 54 energizes an aileron servomotor 55 to displace aileron 20 through a speed reduction gear system 56 to re-establish level craft attitude and at the same time operates an inductive follow-up device 57 which develops an electrical follow-up signal that is fed into the input of the aileron channel of servo amplifier 37 in series with the bank signal by means of lead 58.

Pitch take-off 50, on the other hand, has an electrical signal developed therein in response to a craft climb or dive which is fed to the input of the elevator channel of servo amplifier 37 by means of a lead 59, a glide path computer 60 and a lead 61. The output of the elevator channel of servo amplifier 37 by means of a lead 62 energizes an elevator servomotor 63 to displace elevator 21 through a speed reduction system 64 to re-establish level craft attitude and at the same time operates an inductive follow-up device 65 which develops an electrical follow-up signal that is fed into the input of the elevator channel of servo amplifier 37 in series with the pitch signal by means of a lead 66.

A turn of the aircraft may be produced by feeding into the input of rudder channel of servo amplifier 37 in series with stator winding 36 of signal transmitter 34, rate of turn take-off 23, and follow-up device 24, an independent source of potential having the proper magnitude and phase relationship. The introduction of the turn signal into the automatic pilot will de-energize a clutch solenoid 67, located within master direction indicator 29 (Fig. 1) to disengage the compass 22 from the rudder channel of the amplifier to cause the aircraft to turn at a rate controlled by the rate of turn gyro. The aircraft will continue to turn at its impressed rate until the turn signal is terminated. The termination of the turn signal will energize clutch solenoid 67 to engage compass 22 with the input of the rudder channel of the amplifier to maintain the aircraft on its new course. The foregoing operation is more fully described in aforementioned copending application Serial No. 705,524.

A bank of the aircraft may be produced by feeding into the input of the aileron channel of servo amplifier 37, in series with bank take-off 49, and follow-up device 57, an independent source of potential having the proper magnitude and phase relationship. The introduction of the bank signal into the automatic pilot will cause the aircraft to assume and maintain a banked condition at an angle fixed by the magnitude of the bank signal. When the bank signal is terminated, the aircraft will assume a level attitude.

A craft pitch may be produced by feeding into the input of the elevator channel of servo amplifier 37, in series with pitch take-off 50 and follow-up device 65, an independent source of potential having the proper magnitude and phase relationship. The introduction of the pitch signal into the automatic pilot will cause the aircraft to climb or dive at an angle fixed by the magnitude of the pitch signal. The aircraft will remain in the climb or dive until the pitch signal is terminated, whereupon a level attitude will be assumed.

The turn controller unit for imposing a turn on the craft in the manner hereinabove described may be of the type shown in copending application Serial No. 665,918, filed April 29, 1946. As better shown and more fully described in the latter application a displacement of the trigger type handle to the left or right of a neutral or centered position will open a switch in the controller unit which causes de-energization of coil 67 of the master direction indicator to thereby disconnect signal transmitter 34 from the compass and, therefore, effectively disconnect compass from the rudder. As the handle is displaced from its neutral position, it also displaces variable inductive signal generators, similar to rate signal generator 23 with the rotors of such generators being connected to the same source of alternating current as that to which the rotor of generator 23 is connected, for deriving rudder, aileron and elevator signals independently of their related master instruments. When the handle is returned to its neutral position, on the other hand, the control switch of the controller is closed to energize coil 67 to re-instate compass in rudder and the signal generators of the controller are returned to their null or non-signal generating position.

The pilot system, generally described herein, therefore, is adapted for automatically controlling the various craft surfaces in accordance with a predetermined course and attitude. The pilot system also controls the craft in azimuth and attitude in conformance with signals pre-selected by the human pilot but for range flying and automatic approach and landing control the automatic pilot is made responsive to radio beams from a ground station.

To this latter end, the signals developed in the automatic control system of the present invention for operating the craft control surfaces are created by the localizer flight path and glide flight path computer units generally designated with the reference characters 38 and 60, respectively, in Figure 1. On automatic approach, the craft rudder is automatically actuated in response to heading, rate of change of heading, follow-up and localizer flight path signals, while aileron control is automatically effected through heading, bank, follow-up and localizer flight path signals. Craft elevator, on the other hand, is automatically controlled in accordance with pitch, follow-up, and glide path computer signals.

The signal of localizer computer 38 is communicated to the input of the rudder and aileron channel of servo amplifier 37 of the automatic pilot upon the operation of a switch 68 shown in Figure 3. The latter switch comprises terminals 69, 70 and 71 and a rotatable arcuate contact arm 72, the terminals being spaced equidistantly along the arc of a circle whose center is the axis of rotation of arm 72, the latter, in turn, having a width and length sufficient to make simultaneous contact with all of the terminals so that movement of arm 72 into engagement with terminal 70, for example, will not destroy contact with terminal 69 and movement of the arm into engagement with terminal 71 will not destroy contact with terminals 69 and 70.

Terminal 69 of switch 68 is connected to the heater circuits of the various vacuum tubes, to be described more fully hereinafter, employed within computer 38, while terminal 70 of the switch connects with a line 73 which, in turn, connects through the parallel connected coils of relays 40, 52 and a relay 74 of unit 38 with a conductor 75 connected to a battery 76 whose negative terminal is connected to ground, and terminal 71 of the switch is adapted for connection (not shown) to glide flight path computer 60. Contact arm 72, on the other hand, is connected to ground by way of a lead 77.

Prior to the operative engagement of computer 38 with the automatic pilot, sufficient time must be allowed, after movement of arm 72 into engagement with terminal 69 of switch 68, for the cathode heaters of the various tubes of unit 38 to warm-up. Subsequent thereto, and after the aircraft is brought onto a heading parallel with the localizer flight path beam, contact arm 72 is thereafter moved into engagement with terminal 70 to energize relays 40, 52 and 74 whereupon computer 38 is operatively connected with the automatic pilot.

The output of localizer flight path radio receiver 10 is fed into computer 38 by way of leads 78 and 79 and armatures 40H, 74H of relays 40, 74, respectively. The latter armatures, when relays 40 and 74 are de-energized, that is, when contact arm 72 of switch 68 is out of engagement with terminal 70, normally engage fixed contacts 40I, 74I of the two relays so that the direct current potential signal developed by radio receiver 10 will be impressed across a resistor 80 interconnecting contacts 40I and 74I. With the energization of relays 40 and 74, on the other hand, by the operation of switch 68 wherein contact arm 72 engages with contact 70, armatures 40H, 74H disengage with contacts 40I, 74I and engage instead with fixed contacts 40G, 74G, the latter connecting by way of leads 81, 82 with a magnetic inverter-amplifier device 83 (Figure 2) to impress on the input of the latter the direct current potential signal developed by localizer flight path radio receiver 10.

Magnetic device 83 comprises two permeable cores 84 and 85, each being provided with center legs 86, 87 and spaced outer legs 88, 89 and 90, 91. The outer legs are provided with primary windings 92, 93, 94 and 95 and with secondary windings 96, 97, 98 and 99. The primary windings 92, 93, 94 and 95 are connected in a series aiding relation with each other and energized by a suitable source of alternating current potential (not shown). The secondary windings 96 and 97, are connected in a series aiding relation with each other, and are connected in series opposition with windings 98 and 99, the latter two windings being connected in a series aiding relation with each other. The center legs 86 and 87 are provided with coils 100 and 101, respectively, connected together in series opposition and energized by battery 102 and with coils 103 and 104, connected together in a series aiding relation, and energized by means of leads 81 and 82 by the direct current potential signal developed by radio receiver 10. So long as the direct current potential signal impressed upon coils 103 and 104 is at a null, device 83 is electrically balanced and no alternating current potential appears across the terminals of secondary coils 96, 97, 98, 99. As soon as the craft departs from the localizer flight path beam, however, coils 103 and 104 have impressed across their terminals a direct current potential signal which unbalances device 83 and causes to be developed across the terminals of secondary coils 96, 97, 98, 99 an alternating current potential whose magnitude is proportional to the angular displacement of the aircraft from the localizer beam and whose polarity is determined by the direction of displacement from the beam. For a more detailed description of the theory and operation of magnetic inverter-amplifier 83, reference is made to pending application Serial No. 700,234, filed September 30, 1946.

One terminal of secondary coils 96, 97, 98 and 99 is grounded by means of a lead 105 through the secondary winding of a transformer 106 whose function will be explained hereinafter, while the other terminal is connected by means of a lead 107 to a grid 108 of an amplifier tube 109, the latter also having a plate 110 and a cathode 111. Plate 110 of tube 109 is connected by means of a lead 112 through a coupling condenser 113 to grids 114 and 115 of a discriminator tube 116, the latter also having cathodes 117, 118 and plates 119, 120.

A transformer 121 having a primary winding 122 energized from a suitable source of alternating current potential and a grounded center-tapped secondary winding 123, supplies alternating current potential to plates 119 and 120 of discriminator tube 116. Plate 119 of tube 116 is connected by means of a lead 124 through the primary winding 125 of a transformer 126 to one end terminal of secondary winding 123 of transformer 121, while plate 120 of tube 116 is connected by means of a lead 128 through the primary winding 129 of a transformer 130 to the other end terminal of secondary winding 123.

The alternating current potential developed across the terminals of secondary coils 96, 97, 98 and 99 of device 83 is impressed upon grid 108 of tube 109 for further amplification and the output of the latter tube is, in turn, impressed upon grids 114 and 115 of discriminator tube 116. The sensitivity of the system is such that amplifier tube 109 reaches saturation when the aircraft is off the localizer beam a very small amount, so that the potential applied to grids 114 and 115 of tube 116 is no longer a function of craft angular displacement but only a function of the direction of craft displacement from the localizer beam. Discriminator tube 116 is normally biased to cut-off so that with zero signal potential applied to grids 114 and 115 thereof (when the craft is on the localizer beam) no current flows through either primary winding 125 of transformer 126 or primary winding 129 of transformer 130. Depending upon the polarity of the direct current potential signal applied to the input of device 83, which is determined by the direction of displacement of the aircraft from the localizer beam, plate 119 or 120 of discriminator tube 116 becomes conductive to pass a current through either primary winding 125 of transformer 126 or primary winding 129 of transformer 130.

One terminal of secondary winding 127 of transformer 126 is connected by means of a lead 131 to a grid 132 of an amplifier tube 133, the latter also having a plate 134 and a cathode 135, while the other terminal of secondary winding 127 is grounded. One terminal of secondary winding 136 of transformer 130 is connected by means of a lead 137 to a grid 138 of an amplifier tube 139, the latter also having a plate 140 and a cathode 141, while the other terminal of secondary winding 136 is grounded.

Plate 134 of amplifier tube 133 is connected by means of a lead 142 to a heater element 143 of a thermal time delay device 144, while plate 140 of tube 139 is connected by means of a lead 145 to a heater element 146 of the thermal time delay device. Respective heater elements 143 and 146 are connected by means of leads 147 and 148 to heater elements 149 and 150 of a second thermal time delay device 151. Heater elements 149 and 150 of time delay device 151, on the other hand, are connected by means of leads 152 and 153 to the respective end terminals of a grounded center tapped secondary winding 154 of a transformer 155 which provides a source of potential to plates 134 and 140 of tubes 133 and 139 and whose primary winding 156 is energized from a suitable source of alternating current potential.

Thermal time delay device 144 comprises a sealed tube having mounted therein a pair of resistors 157 and 158 arranged in heat exchange relation with heater elements 143 and 146, respectively, and arranged to constitute two arms of a Wheatstone bridge. The remaining two arms of the Wheatstone bridge are outside of the sealed tube of device 144 and comprise a center tapped resistor 159 whose respective end terminals are connected to the outer terminals of resistors 157 and 158. Across the diagonal of the Wheatstone bridge formed by the center tap of resistor 159 and the junction of resistors 157 and 158, the respective end terminals of a potentiometer 169 are connected. Bridge energization is obtained by means of a transformer 161, consisting of a primary winding 162, energized from a suitable source of alternating current potential, and two secondary windings 163 and 164. Secondary winding 163 applies a potential for the energization of the Wheatstone bridge across the diagonal of the bridge formed by the junctions of the respective end terminals of resistor 159 with resistors 157 and 158.

Thermal time delay device 151, on the other hand, also comprises a sealed tube having mounted therein resistors 165 and 166 arranged in heat exchange relation with heater elements 149 and 150, respectively, one terminal of each resistor being grounded, and both being arranged to constitute two arms of a second Wheatstone bridge. The remaining two arms of the second Wheatstone bridge are outside of the sealed tube of device 151 and comprise a center tapped resistor 167 whose respective end terminals are connected to the ungrounded terminals of resistors 165 and 166. Across the diagonal of the second Wheatstone bridge formed by the center tap of resistor 167 and the grounded junction of resistors 165 and 166, the respective end terminals of a potentiometer 168 are connected. Secondary winding 164 of transformer 161 applies a potential for the energization of the second Wheatstone bridge across the diagonal of the latter bridge formed by the junctions of the respective end terminals of resistor 167 with resistors 165 and 166.

Potentiometers 160 and 168 are provided with movable contact arms which are connected by means of leads 169 and 170 to grids 171 and 172, respectively, of a dual amplifier tube 173, the latter also having plates 174, 175 and cathodes 176, 177. Plate 174 of dual amplifier 173 is connected by means of a lead 178 to the primary winding 179 of a transformer 180 whose secondary winding 181 is connected across the end terminals of a resistor 182, while plate 175 is connected by means of a lead 183 to the primary winding 184 of a transformer 185 whose secondary winding 186 is connected across the end terminals of a resistor 187.

Assuming that the direction of displacement of the aircraft from the localizer beam is such that the polarity of the potential applied to grids 114 and 115 of discriminator tube 116 causes plate 119 to become conductive, plate 120 will remain non-conductive. The flow of current through primary winding 125 of transformer 126 induces within secondary winding 127 a potential which applied to grid 132 of amplifier tube 133 causes plate 134 to become conductive so that current flows through heater elements 143 and 149 of thermal time delay devices 144 and 151, respectively. The flow of current through heater element 143 produces heating which during an interval of thirty seconds, for example, gradually increases the resistance of resistor 157 to a new value. The gradual change in value of resistor 157 unbalances the Wheatstone bridge of which it is a part to produce a voltage across potentiometer 160 which gradually builds up to its steady state value in thirty seconds. The flow of current through heater element 149 produces heating which during an interval of four minutes, for example, gradually increases the resistance of resistor 165 to a new value to unbalance the Wheatstone bridge of which it is a part to produce a voltage across potentiometer 168 which builds up to its steady state value in four minutes. The potentials applied across potentiometers 160 and 168 when impressed upon grids 171 and 172 of dual amplifier tube 173, cause plates 174 and 175 to become conductive so that currents flow through primary windings 179 and 184 of transformers 180 and 185, respectively. The current flowing through primary winding 179 of transformer 180 induces within secondary winding 181, a potential which is impressed across resistor 182 and gradually builds up to its steady state value in thirty seconds. The current flowing through primary winding 184 of transformer 185 induces within secondary winding 186 a potential which is impressed across resistor 187 and gradually builds up to its steady state value in four minutes. (While delay devices 144 and 150 have been described as having time constants of thirty seconds and four minutes, respectively, it is to be specifically understood that they may be designed to possess any other desired time characteristics.)

Assuming, on the other hand, that the direction of displacement of the aircraft from the localizer beam is such that the polarity of the potential applied to grids 114 and 115 of discriminator tube 116 causes plate 120 to become conductive, plate 119 will remain non-conductive. The flow of current through primary winding 129 of transformer 130 induces within secondary winding 136 a potential which applied to grid 138 of amplifier tube 139 causes plate 140 to become conductive so that current flows through heater elements 146 and 150 of thermal time delay devices 144 and 151, respectively. The flow of current through heater element 146 produces heating which during a period of thirty seconds, for example, gradually increases the resistance of resistor 158 to a new value to unbalance the Wheatstone bridge of which it is a part to produce across potentiometer 160 a voltage, having a polarity opposite to that caused by the unbalance of resistor 157, which gradually builds up to its steady state value in thirty seconds. The flow of current through heater element 150 produces heating which during a period of four minutes, for example, gradually increases the resistance of resistor 166 to a new value to unbalance the Wheatstone bridge of which it is a part to produce across potentiometer 168 a voltage, having a polarity opposite to that caused by the unbalance of resistor 149, which builds up to its steady state value in four minutes. The potentials impressed across respective potentiometers 160 and 168 are transmitted through dual amplifier tube 173, transformers 180 and 185 in the same manner as described above to impress across resistor 182 a potential of opposite polarity which builds up to its steady state value in thirty seconds and across resistor 187 a potential of opposite polarity which builds up to its steady state value in four minutes.

Due to the fact that vacuum tubes 109, 116, 133, 139 and 173 are operating at their saturation points, the magnitude of the steady state value of the signal potentials impressed across resistors 182 and 187 remains constant and does not vary with the angular displacement of the aircraft from the localizer beam until the craft comes very close to the beam and finally decays to zero upon the craft's interception of the beam. The signal potentials impressed across resistors 182 and 187, therefore, are only responsive to the direction and the period of time that the aircraft has been displaced from the localizer beam.

In order to secure another signal potential which will be responsive to the angular displacement of the aircraft from the localizer beam as distinguished from the above discussed signal which is responsive to the direction and the period of time that the craft has been displaced from the localizer beam, the direct current potential developed by the localizer path radio receiver 10 upon the departure of the aircraft from the localizer beam is also impressed upon the input of a second magnetic inverter-amplifier device 188 by means of leads 189 and 190 which are tapped off leads 81 and 82, respectively.

Magnetic inverter-amplifier device 188 is similar to magnetic inverter-amplifier 83 in structure and operation, so that its output develops an alternating current potential whose magnitude is proportional to the angular displacement of the aircraft from the localizer beam and whose polarity is determined by the direction of displacement from the latter beam. When the automatic approach control system is engaged some distance out from the axis of the localizer beam, it is not feasible to insert suddenly the alternating current signal potential developed by device 188 into the automatic pilot due to its excessive initial magnitude. If the alternating current signal potential is inserted suddenly into the automatic pilot, its excessive initial magnitude will cause the rudder and aileron control surfaces to be displaced so suddenly and violently to their extreme positions as to cause a turning aircraft to roll over. To make the alternating current signal potential of device 188 usable, therefore, it is necessary that the latter signal be initially inserted gradually by limited amounts into the automatic pilot whereby the rudder and aileron control surfaces will be displaced in such a manner to the desired positions that the aircraft will gradually turn in the direction of the localizer beam without rolling over.

Device 188 is provided with series connected primary energizing windings 191, 192, 193 and 194 together with output of secondary windings 195, 196, 197 and 198, the latter being connected with each other in a manner similar to the connection of the secondary windings of device 83. One manner of making the signal output of this device practicably usable is to control the energization of the primary windings in such a manner as to provide the latter with a slow buildup so that the potential developed at the secondary windings will be a reproduction of the slow buildup of the potential applied to the primary energizing windings.

To this latter end, an alternating current potential from a suitable source for energizing primary windings 191, 192, 193 and 194 of device 188 is impressed by means of leads 199 and 200 across the respective end terminals of a center-tapped resistor 201 which forms two adjacent legs of a Wheatstone bridge circuit, the remaining two legs of which are defined by a second resistor 202 and a further resistor 203 which, in turn, constitutes an element of a thermal time delay device 204. The latter device also includes a heater element 205 arranged in heat exchange relation with resistor 203 so that a flow of current through element 205 will produce heating thereof which, during a predetermined interval of time, will gradually vary the resistance value of resistor 203 to progressively unbalance the bridge circuit to produce between the center tap of resistor 201 and the junction of resistors 202, 203 a slow buildup potential. The interval of time within which the potential slowly builds up across the bridge circuit is determined by the time constant selected for device 204.

Flow of current through heater element 205 of tube 204 for gradually unbalancing the control bridge circuit for slowly building up the energizing current for primary windings 191, 192, 193 and 194 of device 188, is controlled by a pair of thermal relays 206 and 207 and a pair of electromagnetic relays 208 and 209. Thermal relays 206, 207, respectively, consist of fixed contacts 206A, 207A and movable armatures 206B, 207B while electro-magnetic relay 208 consists of fixed contacts 208A, 208D, 208G, and other fixed contacts 208C, 208F, 208I, normally engaged by movable armatures 208B, 208E, 208H, and electromagnetic relay 209 consists of fixed contacts 209A, 209D, 209G and other fixed contacts 209C, 209F, 209I normally engaged by movable armatures 209B, 209E, 209H.

One terminal of the heating element of thermal relay 206 is connected by means of a lead 210 to line 73 (Figure 3) while the other terminal thereof is connected by means of a lead 211 to fixed contact 208F of relay 208 (Figure 2) which, through engagement with movable armature 208E, connects by way of a lead 212 to the positive line 75 of Figure 3. Fixed contact 206A and movable armature 206B of thermal relay 206 are, respectively, connected by means of leads 213 and 214 to fixed contact 208A and movable armature 208B of relay 208. Furthermore, fixed contact 206A is also connected by means of a lead 215 to movable armature 208E of relay 208.

The operating coil of relay 208 is connected at one of its ends to armature 208B of the latter relay by way of a lead 216 and at its other end connects by means of a lead 217 to movable armature 218B of a relay 218 (Figure 3), the latter relay including a fixed contact 218A which is connected to line 73 by means of a lead 219.

When switch 68 is operated to the vacuum tube warmup position, i. e., with contact arm 72 in engagement with terminal 69, relay 218 is energized by means to be presently described so that its armature 218B will be engaged with fixed contact 218A when localizer flight path computer unit 38 is engaged with the automatic pilot.

One end of heater element 205 of thermal delay device 204 is connected by means of a lead 220 to fixed contact 208D of relay 208 while its opposite end is connected by means of a lead 221 to movable armature 209E of relay 209. The junction point of resistors 202, 203, is connected by way of a lead 222 to fixed contact 209I of relay 209 while fixed contact 209G of the latter relay connects with the junction point of resistors 201, 202. Armature 209H of relay 209 and the center tap of resistor 201 are connected, respectively, by means of leads 223 and 224 to primary energizing windings 191-194 of magnetic device 188.

Fixed contact 209F of relay 209 is connected by means of a lead 225 to the ungrounded terminal of the heating element of thermal relay 207 while fixed contact 209A and movable armature 209B of relay 209 are, respectively, connected by means of leads 226 and 227 to fixed contact 207A and armature 207B of thermal relay 207. Fixed contact 207A, moreover, is also connected to fixed contact 208G of relay 208 by means of a lead 228 while one terminal of the operating coil of relay 209 is connected by means of a lead 229 to relay armature 209B and the other terminal is connected to movable armature 208E of relay 208 by means of a lead 230.

Upon the operation of switch 68 to engage computer unit 38 with the automatic pilot, i. e., with contact arm 72 (Figure 3) in engagement with terminals 69, 70, the heating element of thermal relay 206 is grounded whereupon current flows therethrough with the resultant heating of the element, the time setting thereof being so selected that with the elapse of fifteen seconds, for example, armature 206B is caused to engage with contact 206A thereby applying a potential to energize relay 208. Energization of the latter relay causes armature 208B thereof to engage contact 208A to maintain the circuit for the operating coil of relay 208 upon the interruption of the circuit of the heating element of thermal relay 206 by the disengagement of armature 208E from fixed contact 208F. Engagement of armature 208E with contact 208D, on the other hand, due to energization of relay 208 produces a flow of current through heater element 205 of device 204 and through the heating element of thermal relay 207 thereby heating the latter elements.

Due to the heating of element 205 of time delay device 204, a gradually increasing potential is developed between the center tap-off of resistor 201 and the junction of resistors 202, 203 which is impressed by means of leads 223, 224 upon the primary windings of device 188.

The time setting of the heating element of thermal relay 207 may be so selected that upon the elapse of thirty seconds, for example, armature 207B thereof will be caused to engage contact 207A thereby applying a potential to energize relay 209. Energization of the latter relay, causes armature 209E to engage contact 209D to maintain the circuit for the operating coil of relay 209 upon the interruption of the circuit of the heating element of thermal relay 207 and heater element 205 of thermal time delay device 204 by the disengagement of armature 209E from contact 209F. Disengagement of armature 209E from contact 209F removes the source of bridge unbalance, i. e., discontinues current flow through heater element 205 of device 204 whereby the potential developed between the center tap of resistor 201 and the junction of resistors 202, 203 gradually delays or drops to a null to balance the bridge circuit as the value of the resistance of resistor 203 progressively returns to its normal value. At the same time that the circuit of heater element 205 is interrupted, armature 209H of relay 209 disengages contact 209I to engage contact 209G whereupon resistor 201 is substituted for the bridge circuit as a source of a steady state potential for the primary energizing windings of magnetic amplifier device 188.

The heating elements of thermal relays 206 and 207 as well as heater element 205 of device 204 are permitted to cool to their normal state by virtue of the interruption of their circuits resulting from the continuous energization of relays 208 and 209, the latter relays being deenergized only in response to the operation of switch 68 to disconnect localizer flight path computer 38 from the automatic pilot or by the operation of relay 218 (Figure 3) as will presently appear.

The gradually increasing potential impressed upon the primary windings of magnetic device 188 due to the bridge unbalance described above is reproduced at the output of secondary windings 195-198 of the device and impressed by way of leads 231 across a resistor 232 (Figure 2), assuming that a D. C. signal is available at the output of radio receiver 10 due to displacement of the craft relative to the localizer beam.

As heretofore indicated, three independent alternating current control signals are developed by computer 38. The first such signal, impressed across resistor 182, is a potential which progressively increases to its steady state value in thirty seconds while the second control signal, impressed across resistor 187, is a potential which gradually increases to its steady state value in four minutes. The third control signal, on the other hand, impressed across resistor 232, is a potential which remains at zero value for an interval of fifteen seconds and subsequently progressively increases to its steady state value in thirty seconds. The first and second control signals are responsive only to the direction and interval of time that an aircraft has been displaced from the axis of the localizer flight path beam. The third control signal, on the other hand, is responsive to the amount of angular displacement and the direction that the aircraft has been displaced from the axis of the localizer flight path beam.

The changing sensitivity of the system, as the aircraft approaches the transmitter which radiates the flight path beam, due to the change in distance from the beam for a given craft heading is overcome by the combined use of the three control signals. If, for example, the craft is within the minimum operating range of the localizer flight path transmitter, the first control signal will provide the proper amount of rudder and aileron deflection to bring the craft onto the flight path beam without over control. Again, if the aircraft is at the outer limits of the operating range of the localizer flight path transmitter, the three control signals will combine to provide the proper amount of rudder and aileron deflection to bring the craft onto the localizer beam in a desirable manner. For operations between the two extreme operating range limits of the localizer transmitter, the combination of the first and third control signals will provide the correct amount of rudder and aileron deflection to bring the craft onto the localizer beam without any violent reaction. Flight path computer 38, therefore, creates a turn control signal potential that is sensitive to the angular displacement from the localizer beam and introduces automatically the necessary corrections for operations at the extreme operating ranges of the localizer transmitter.

When the aircraft is placed under the control of the novel automatic approach control system of the present invention, the directional displacement signal of compass 22 is introduced into flight path computer 38 and algebraically added to the turn control signal developed therein. The introduction of the compass signal into computer unit 38 provides the required control to direct the craft to attain the heading of the localizer beam. The turn control signal, on the other hand, developed by computer unit 38 directs the craft toward the localizer beam while the combination of the compass signal and the turn control signal will direct the craft to attain a ground track defined by the localizer beam.

Figure 2:
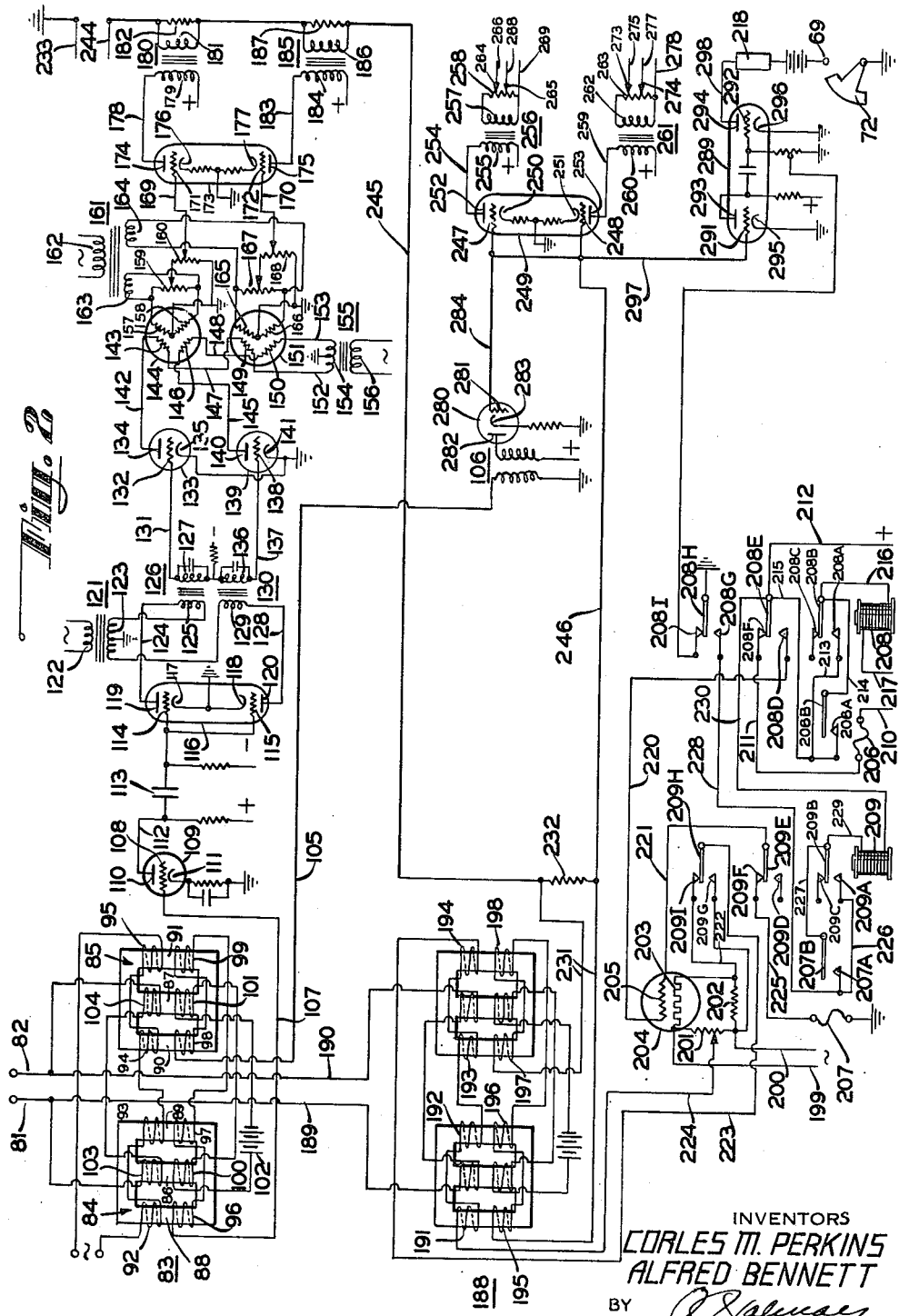
Figure 2 is a schematic diagram of the localizer flight path computer of the novel automatic approach control system of the present invention.

Upon operation of contact arm 72 of switch 68 to engage terminal 70, the compass displacement signal is impressed on the control signal or signals developed by the computer unit. Such switch operation energizes relay 40 (Figure 3) whereupon armatures 40B, 40E thereof are disengaged from their contacts 40C, 40F and brought into engagement with contacts 40A, 40D. Fixed contact 40A is grounded by means of a lead 233 (Figure 2) while contact 40D (Figure 3) is connected by means of a lead 234 to one end of resistor 182 (Figure 2). In this manner the compass displacement signal is fed into computer 38 by means of lead 39 to be impressed upon the control signal or signals developed in the computer.

The opposite end of resistor 182 is connected to one end of resistor 187 whose other end is connected by means of a lead 245 to one end of resistor 232, the other end of the latter resistor, in turn, being connected by a lead 246 to grids 247, 248 of an isolator tube 249 which also includes cathodes 250, 251 and plates 252, 253.

Plate 252 of the latter tube is connected by means of a lead 254 to the primary winding 255 of a transformer 256 whose secondary winding 257 is connected across the end terminals of a variable resistor 258 associated with the rudder channel of the automatic pilot while plate 253 of the tube is connected by means of a lead 259 to the primary winding 260 of a transformer 261 whose secondary winding 262 is connected across the end terminals of a variable resistor 263 associated with the aileron channel of the automatic pilot. It will now be apparent that the potentials impressed across resistors 182, 187 and 232 combine algebraically to be available for rudder control at resistor 258 and for aileron control at resistor 263. In other words, the algebraic sum of the turn control and directional displacement signals is impressed upon both grids 247 and 248 of tube 249 to develop control potentials across resistors 258, 263 for rudder and aileron control, respectively.

For communicating the signal across resistor 258 to the rudder channel of amplifier 37, the resistor is provided with adjustable tap connections 264, 265, the former being connected by a lead 266 to a fixed contact 267C of a relay 267 (Figure 3) and the latter being connected by a lead 268 to a fixed contact 267A of the relay. The end terminal of resistor 258 adjacent tap connection 265 is connected by means of a lead 269 to armature 74E of relay 74. In addition to fixed contacts 267A and 267C, relay 267 also includes a movable armature 267B which is connected by means of a lead 270 to movable armature 74B of relay 74. In response to the energization of the latter relay, its armatures 74B, 74E are disengaged from contacts 74C, 74F to become engaged with contacts 74A, 74D. Fixed contact 74A is connected by means of a lead 271 to fixed contact 40C of relay 40 while fixed contact 74D is connected by means of a lead 272 to fixed contact 40F of the latter relay. In this manner, assuming relays 40 and 267 to be energized, the rudder displacement control signal developed by computer 38 is fed into the input of the rudder channel of amplifier 37 in series with the signals of rate take-off 23 and follow-up device 24.

For communicating the signal across resistor 263, on the other hand, to the aileron channel of amplifier 37, the resistor is provided with adjustable tap connections 273 and 274, the former being connected by means of a lead 275 to a fixed contact 276A of a relay 276 (Figure 3) and the latter being connected by means of a lead 277 to a fixed contact 276C of the latter relay. The end terminal of resistor 263 adjacent tap connections 274 is connected by means of a lead 278 to fixed contact 52D of relay 52. In addition to fixed contacts 276A and 276C, relay 276 also includes a movable armature 276B which connects by way of a lead 279 with fixed contact 52A of relay 52. In response to the energization of the latter relay, armatures 52B, 52E thereof are disengaged from their contacts 52C, 52F and caused to engage contacts 52A, 52D to thereby insert the aileron displacement signal developed by computer unit 38 into the input of the aileron channel of amplifier 37 in series with the signals of bank take-off 49 and follow-up device 57.

In response to the displacement signal or signals developed by flight path computer 38 and inserted into the automatic pilot, the rudder and aileron surfaces are displaced from their normally centered position in a direction to cause the craft to turn toward the localizer beam. Upon interception of the latter beam by the craft, the D. C. signal developed by radio receiver 10 drops to zero whereupon the signals developed at the secondary outputs of magnetic devices 83 and 188 of Figure 2 also drop to zero. As a result thereof, the signal potential across resistor 232 immediately drops to zero while the signal potentials across resistors 182 and 187 do not at once drop to zero but, instead, slowly decay to zero.

The slow decay of potentials impressed across resistors 182 and 187 is due to the gradual cooling of heated resistors 157, 158, 165 and 166 of thermal delay devices 144 and 151 resulting in continued unbalance of the bridge circuits of which they are parts. It is desirable that resistors 157, 158, 165 and 166 attain their normal temperatures and, therefore, resistance values when the craft intercepts the localizer beam so as to secure immediate reverse operation when the craft passes to the opposite side of the beam. In order to provide zero potential across resistors 182 and 187 when the craft intercepts the beam, it is necessary that the A. C. signals applied to grid 108 of tube 109 be discontinued an interval of time prior to craft interception of the beam sufficient to cool resistors 157, 158, 165 and 166 of delay devices 144 and 151 so that their associated bridge circuits will be re-balanced as the beam is intercepted.

One manner of deriving this desired result is to impress on the secondary windings of magnetic device 83 a feed-back signal equal and opposite to the signal appearing at the latter windings. To this end, an anticipatory control in the form of an amplifier tube 280 is provided, such tube having a grid 281, plate 282 and cathode 283. Grid 281 is connected by means of a lead 284 to grids 247 and 248 of isolator tube 249 while plate 282 is connected to the primary winding of transformer 106. Tube 280 is so biased that a portion of the turn control and displacement signals which are impressed on the grids of tube 249 is also impressed on grid 281 of tube 280 so that current flows at plate 282 thereof to induce within the secondary of transformer 106 a potential of a magnitude and polarity that will cut-off the potential applied to grid 108 of tube 109 a desired interval of time prior to craft interception of the beam sufficient to re-balance the bridge circuits of delay devices 144 and 151 at the time that the craft intercepts the beam.

When the aircraft intercepts the beam and, thereafter, passes to the other side thereof, the compass displacement signal continues to act upon the rudder and aileron surfaces to restore the craft to its original heading, i. e., parallel to the localizer beam. Flight path computer 38, on the other hand, begins to operate again, in the manner heretofore described, to develop a reverse turn signal whereby rudder and aileron surfaces are displaced to turn the craft toward the beam. If a second crossing is made so that the aircraft again goes beyond the beam, compass 22 and flight path computer 38 continue to operate until the craft has attained the ground track defined by the localizer beam transmitter.

Flight path computer 38 is adapted for range flying as well as for flying the localizer flight path. Inasmuch as the aircraft travels at a higher speed during range flying, it is necessary that the rudder and aileron control signals developed by computer 38 for flying the localizer beam, be reduced in magnitude. To this end, a switch 285 (Figure 3) together with relays 267, 276 and adjustable tap connections 264 and 273 of resistors 258 and 263 are provided.

Switch 285 consists of a pivotal contact arm 286 and a fixed terminal 287, the former being grounded and the latter being connected by means of a lead 288 to one terminal of the operating coil of relay 276 whose other terminal is connected to line 75 through the operating coil of relay 267.

Operation of switch 285 to a closed position energizes relays 267 and 276 so that armature 267B of the former engages contact 267A thereby tapping off the rudder displacement signal between lead 269 and tap-off connection 268 to provide a smaller rudder control signal into the automatic pilot, and armature 276B of the latter relay engages contact 276A thereby tapping off the aileron displacement signal between lead 278 and tap-off connection 277 to provide a smaller aileron displacement signal into the automatic pilot.

In the event that a failure occurs in some part of the network of computer unit 38, such as a failure of either thermal time delay devices 144 or 151, or a sudden change in the direction of the beam, caused by another aircraft taxiing in front of or by passing over the localizer beam transmitter whereby too high and dangerous rudder and aileron displacement signals are developed by computer 38, a safety control in the form of a double amplifier tube 289 (Figure 2) and a relay 290 together with relay 218 is provided to prevent the insertion of the undesirable signals into the automatic pilot.

Tube 289 includes grids 291, 292, plates 293, 294 together with cathodes 295, 296. Grid 291 of the tube is connected by means of a lead 297 to grids 247, 248 of tube 249 while plate 293 is connected to the other grid 292. Plate 294, on the other hand, is connected by means of a lead 298 to one terminal of the operating coil of relay 218 while the other terminal of the latter coil is connected by means of a lead 299 to positive plate potential. One terminal of the operating coil of relay 290 is connected to positive line 75 while the other terminal of the latter coil is connected by means of a lead 300 to armature 218B of relay 218. Armature 290A and contact 290B of relay 290 are connected respectively by leads 301 and 302 to armatures 74E and 74B of relay 74 while armature 290C and contact 290D of relay 290 are connected respectively by means of leads 303 and 304 to contacts 52D and 52A of relay 52.

When switch 68 is operated so that its contact arm 72 engages terminal 69, plate 294 of dual tube 289 becomes conductive to energize relay 218 so that armature 218B thereof is brought into engagement with fixed contact 218A which, in turn, energizes relay 290 whereby armatures 290A and 290C thereof are disengaged from their respective contacts 290B and 290D to remove the short circuits from the sources of rudder and aileron displacement signals developed by computer 38. Subsequent operation of switch 68 so that arm 72 engages terminal 70 does not interrupt the operation of plate 294 of tube 289.

The development of excessive rudder and aileron displacement signals is the result of excessive potentials impressed across any one of resistors 182, 187 or 232 whereby the grids 291 and 292 of tube 289 will be driven so positive that they will start rectifying thus starving the plate of electrons so that substantially no current will flow at its place 294. This results in the de-energization of relay 218 whose armature 218B disengages from contact 218A to de-energize relay 290. Upon de-energization of the latter relay armatures 290A and 290C thereof engage with their related contacts 290B and 290D to short circuit the sources of rudder and aileron displacement signals developed by computer 38 and thus the latter are prevented from insertion into the automatic pilot.

De-energization of relay 218 also results in the de-energization of relay 209 (Figure 2). If de-energization of the latter relay occurs during the initial insertion of the craft angular displacement signal developed by magnetic device 188 into the automatic pilot, the circuit of heater element 205 of thermal delay device 204 will be interrupted to, in turn, interrupt the heating of resistor 203 to thereby remove the element of unbalance from the bridge circuit of which the latter resistor is a part. As the bridge regains its balanced condition, the potential impressed across resistor 232 decays to zero. If, on the other hand, de-energization of relay 208 occurs after the total insertion of the angular displacement signal developed by magnetic device 188 into the automatic pilot, i. e., when a steady state signal is being supplied to the primary energizing windings of magnetic device 188, relay 209 is also de-energized whereupon the steady state signal supplied to the primary windings of device 188 is interrupted and no signal appears at either the output windings of device 188 or across resistor 232. So long as relay 218 remains de-energized, therefore, it is not possible to develop a potential in accordance with craft angular displacement from the localizer beam at the output of the secondary windings of magnetic device 188.

As soon as the cause of the excessive signals across any one of resistors 182, 187 or 232 has been removed, the bias of grid 291 of tube 289 is reduced so that plate 293 becomes non-conductive whereupon the bias of grid 292 is increased to cause plate 294 to become conductive whereupon relays 218 and 290 are energized to remove the short circuits from the sources of rudder and aileron displacement signals developed by computer 38 and to thus permit their insertion into the automatic pilot. Energization of relay 218 also permits gradual insertion of the craft angular displacement signal developed by magnetic device 188 into the automatic pilot as heretofore more fully described.

In order to fly along the vertical or glide path beam, switch 68 is operated so that arm 72 thereof engages with terminal 71 to bring flight path computer 60 into operation, the latter operating in the manner more fully disclosed in pending application Serial No. 705,524, filed October 25, 1946.

In flying an aircraft, equipped with the novel apparatus of the present invention, from one airport to another, the human pilot may first fly on visual range between the stations and subsequently make an automatic approach on the localizer and glide flight path beam. Following a take-off, radio 10 is tuned to the frequency of the visual range and the craft is flown to attain a heading parallel to the beam, this condition, when attained, being evidenced when vertical pointer 15 of cross pointer indicator 14 remains in its normally centered position. Thereafter switch 68 is operated so that contact arm 72 thereof is placed in engagement with terminal 69 to provide a warm-up interval and switch 285 is operated to its closed position to secure the desired adjustment for range flying of the rudder and aileron displacement signals. When the craft has attained the desired heading relative to the beam, switch 68 is again operated so that contact arm 72 thereof engages with terminal 70 to engage computer 38 with the automatic pilot whereupon the craft will be automatically flown down the visual range beam to its destination.

As the craft, thereafter, approaches its destination and it is desired to go into the automatic approach procedure, switch 68 is operated to disconnect contact arm 72 from terminal 70 to disengage computer 38 from the automatic pilot, leaving the craft under the control of the automatic pilot. Switch 285 is opened to disconnect its contact arm 285 from terminal 287 to thereby adjust the source of rudder and aileron displacement signals suitable for flying the localizer beam. Radios 10 and 11 are thereafter tuned to the frequencies of the approach system. The speed of the craft is thereafter reduced to approach speed and the craft is brought to a heading parallel to the localizer beam at which time switch 68 is operated so that arm 72 thereof engages terminal 70 to operatively connect computer output with the automatic pilot. Subsequent thereto, the craft is flown to intersect the glide path beam at an angle preferably less than ten degrees and when the latter is intersected, manifested by pointer 18 of cross pointer indicator 14, switch 68 is again operated so that contact arm 72 engages terminal 71 to operatively connect glide path computer 60 with the elevator channel of amplifier 37 of the automatic pilot.

As will now be apparent to those skilled in the art, a novel and desirable navigation system has been provided for automatically steering an aircraft in two planes for instrument or blind landing purposes, utilizing a controllable signal dependent in polarity and magnitude upon craft direction of displacement and amount of angular displacement relative to the beam being followed.

Although but one embodiment of the invention has been illustrated and described in detail, various changes and modifications in the form and relative arrangement of parts, which will now appear to those skilled in the art, may be made without departing from the scope of the invention.

We claim:

1. In an automatic steering system for a vehicle having a control surface movable with respect thereto for controlling said vehicle about an axis thereof, a servomotor for operating said surface, reference means on said vehicle for generating a signal proportional to the amount of departure of said vehicle from a predetermined position, and control means for gradually reproducing said signal for operating said servomotor.

2. In an automatic steering system for a vehicle having a control surface movable with respect thereto for controlling said vehicle about an axis thereof, a servomotor for operating said surface, reference means on said vehicle for generating a signal proportional to the amount of departure of said vehicle from a predetermined position, and means comprising a time delay device interconnecting said servomotor and said reference means for gradually reproducing said signal for operating said servomotor.

3. In an automatic steering system for a vehicle having a control surface movable with respect thereto for controlling said vehicle about an axis thereof, a servomotor for operating said surface, reference means on said vehicle for generating a signal proportional to the amount of departure of said vehicle from a predetermined position, and means comprising a thermal time delay relay interconnecting said servomotor and said reference means for gradually reproducing said signal for operating said servomotor.

4. In an automatic steering system for a vehicle having a control surface movable with respect thereto for controlling said vehicle about an axis thereof, a servomotor for operating said surface, reference means on said vehicle for generating a signal proportional to the amount of departure of said vehicle from a predetermined position, control means interconnecting said servomotor and said reference means for gradually reproducing said signal for operating said servomotor, and means associated with said control means and operative when said signal exceeds a predetermined value to discontinue said signal to said servomotor.

5. In an automatic steering system for a vehicle having a control surface movable with respect thereto for controlling said vehicle about an axis thereof, a servomotor for operating said surface, reference means on said vehicle for generating a signal proportional to the amount of departure of said vehicle from a predetermined position, control means interconnecting said servomotor and said reference means for gradually reproducing said signal for operating said servomotor, means associated with said control means and operative when said reproduced signal exceeds a predetermined value to discontinue said signal to said servomotor, and means operative when said reproduced signal drops below said predetermined value to operate said control means to gradually re-build said signal for operating said servomotor.

6. In an automatic steering system for a vehicle having a control surface movable with respect thereto for controlling said vehicle about an axis thereof, a servomotor for operating said surface, reference means on said vehicle for generating a signal proportional to the amount of departure of said vehicle from a predetermined position, and control means for gradually reproducing said signal for operating said servomotor and for terminating said reproduced signal when the latter exceeds a predetermined value.

7. In an automatic steering system for a vehicle having a control surface movable with respect thereto for controlling said vehicle about an axis thereof, a servomotor for operating said surface, reference means on said vehicle for generating a signal proportional to the amount of departure of said vehicle from a predetermined position, and control means for gradually reproducing said signal for operating said servomotor, for terminating said reproduced signal when the latter exceeds a predetermined value, and for re-enstating said reproduced signal when the latter drops to a value below said predetermined value.

8. In an automatic steering system for a vehicle having a control surface movable with respect thereto for controlling said vehicle about an axis thereof, a servomotor for operating said surface, reference means on said vehicle for generating a signal proportional to the amount of departure of said vehicle from a predetermined position, and control means for gradually reproducing said signal and for intermittently inserting and terminating said reproduced signal to said motor.

9. In an automatic steering system for a vehicle having a control surface movable with respect thereto for controlling said vehicle about an axis thereof, a servomotor for operating said surface, reference means on said vehicle for generating a signal proportional to the amount of displacement of said vehicle from a predetermined position, and control means for periodically reproducing said displacement signal in a delayed manner when said signal exceeds a predetermined value for operating said servomotor.

10. In an automatic steering system for a vehicle having a control surface movable with respect thereto for controlling said vehicle about an axis thereof, a servomotor for operating said surface, reference means on said vehicle for generating a signal proportional to the amount of displacement of said vehicle from a predetermined position, and control means for reproducing said displacement signal in a delayed manner when said signal does not exceed a predetermined value and for continuously inserting said reproduced signal into said motor for operating the latter and for intermittently inserting said reproduced signal into said motor when the signal exceeds a predetermined value.

11. Apparatus for automatically guiding an aircraft toward a fixed point, comprising a radio receiver on said craft for receiving radiant energy transmitted from said fixed point which provides a flight path for said aircraft toward said fixed point, means for deriving from said received energy a control signal which is a function of the time duration of the received energy as determined by the length of time that the aircraft is away from said path, means for deriving from said received energy a further signal which is a function of the angular displacement of said aircraft from said path, and means responsive to said signals for controlling craft flight along said path.

12. Apparatus for automatically guiding an aircraft toward a fixed point, comprising a radio receiver on said craft for receiving radiant energy transmitted from said fixed point which provides a flight path for said aircraft toward said fixed point, means for deriving from said received energy a control signal which is a function of the time duration of the received energy as determined by the length of time that the aircraft is away from said path, means for deriving from said received energy a further signal which is a function of the angular displacement of said aircraft from said path, means for algebraically combining said signals, and means responsive to said combined signals for controlling said craft flight along said path.

13. Apparatus for automatically guiding an aircraft toward a fixed point, comprising radio receiving means on said craft for receiving radiant energy transmitted from said fixed point which provides a flight path for said aircraft toward said fixed point, means for deriving from said received energy a control signal which is a function of the time duration of the received energy as determined by the length of time that the aircraft is away from said path, means for deriving from said received energy a further signal which is a function of the angular displacement of said aircraft from said path, means responsive to said signals for controlling craft flight along said beam, and means operative when said second-named signal exceeds a predetermined value to discontinue the latter signal.

14. Apparatus for automatically guiding an aircraft toward a fixed point, comprising radio means on said aircraft for receiving radiant energy transmitted from said fixed point which provides a flight path for said aircraft toward said fixed point, means for deriving from said received energy a direct current control signal which is a function of the angular displacement of said aircraft from said path, means for deriving from said control signal an alternating current signal which is a function of the time duration of the control signal as determined by the length of time that the aircraft is displaced from said path, means for deriving a second alternating current signal from said control signal which is a function of said control signal, and means responsive to said alternating current signals for controlling craft flight along said path.

15. Apparatus for automatically guiding an aircraft toward a fixed point, comprising radio means on said aircraft for receiving radiant energy transmitted from said fixed point which provides a flight path for said aircraft toward said fixed point, means for deriving from said received energy a direct current control signal which is a function of the angular displacement of said aircraft from said path, means for deriving from said control signal an alternating current signal which is a function of the time duration of the control signal as determined by the length of time that the aircraft is displaced from said path, means for reproducing in a delayed manner said control signal as a second alternating current signal, and means responsive to said alternating current signals for controlling craft flight along said path.

16. Apparatus for automatically guiding an aircraft toward a fixed point, comprising radio means on said aircraft for receiving radiant energy transmitted from said fixed point which provides a flight path for said aircraft toward said fixed point, means for deriving from said received energy a reference signal which is a function of the angular displacement of said aircraft from said path, means for deriving from said reference signal a first control signal which is a function of the time duration of the reference signal as determined by the length of time that the aircraft is displaced from said path, means for reproducing said reference signal in a delayed manner as a second control signal, and means responsive to said control signals for controlling craft flight along said path.

17. Apparatus for automatically guiding an aircraft toward a fixed point, comprising radio means on said craft for receiving radiant energy transmitted from said fixed point which provides a flight path for said aircraft toward said fixed point, means for deriving from said received energy a reference signal which is a function of the angular displacement of said aircraft from said path, means for deriving from said reference signal a first control signal which is a function of the time duration of the reference signal as determined by the length of time that the aircraft is displaced from said path, means for reproducing said reference signal in a delayed manner as a second control signal, means responsive to said control signals for controlling craft flight along said path, and means operative when said reference signal exceeds a predetermined value for periodically operating and terminating operation of said reproducing means.

18. Apparatus for automatically guiding an aircraft toward a fixed point, comprising radio means on said aircraft for receiving radiant energy transmitted from said fixed point which provides a flight path for said aircraft toward said fixed point, means for deriving from said received energy a control signal which is a function of the angular displacement of said aircraft from said path, means responsive to said signal for controlling craft flight along said path, and means for delaying and gradually inserting said control signal into said controlling means.

19. Apparatus for automatically guiding an aircraft toward a fixed point, comprising radio means on said aircraft for receiving radiant energy transmitted from said fixed point which provides a flight path for said aircraft toward said fixed point, means for deriving from said received energy a reference signal which is a function of the angular displacement of said aircraft from said path, means for reproducing said signal in a delayed and gradual manner to its maximum or steady-state value, and means for controlling craft flight in accordance with said reproduced signal.

20. Apparatus for automatically guiding an aircraft toward a fixed point, comprising means on said aircraft for receiving radiant energy transmitted from said fixed point which provides a flight path for said aircraft toward said fixed point, means for deriving from said received energy a reference signal which is a function of the angular displacement of said aircraft from said path, means for reproducing said signal in a delayed and gradual manner when said signal does not exceed a predetermined value and for periodically reproducing said signal when the latter exceeds a predetermined value, and means for controlling craft flight in accordance with said reproduced signal.

21. Apparatus for automatically guiding an aircraft having an automatic pilot thereon together with means for receiving energy transmitted from a ground station which provides a predetermined path for said aircraft toward a fixed point, said apparatus comprising means connected to said energy receiving means for deriving from said received energy a control signal which is a function of the angular displacement of said aircraft from said path, means responsive to said signal for operating said automatic pilot, and means for delaying and thereafter gradually inserting said signal into said operating means.

22. Apparatus for automatically guiding an aircraft having an automatic pilot thereon together with means for receiving energy transmitted from a ground station which provides a predetermined path for said aircraft toward a fixed point, said apparatus comprising means connected to said energy receiving means for deriving from said received energy a control signal which is a function of the angular displacement of said aircraft from said path, and means for delaying and thereafter gradually inserting said signal into said automatic pilot.

23. Apparatus for automatically guiding an aircraft having an automatic pilot thereon together with means for receiving energy transmitted from a ground station which provides a predetermined path for said aircraft toward a fixed point, said apparatus comprising means connected to said energy receiving means for deriving from said received energy a control signal which is a function of the angular displacement of said aircraft from said path, and means for intermittently inserting a portion of said signal into said automatic pilot when said control signal exceeds a predetermined value.

24. Apparatus for automatically guiding an aircraft having an automatic pilot thereon together with means for receiving energy transmitted from a ground station which provides a predetermined path for said aircraft toward a fixed point, said apparatus comprising means connected to said energy receiving means for deriving from said received energy a control signal which is a function of the angular displacement of said aircraft from said path, and means for periodically communicating a control signal to said automatic pilot when said first control signal exceeds a predetermined value.

25. Apparatus for automatically guiding an aircraft having an automatic pilot thereon together with means for receiving energy transmitted from a ground station which provides a predetermined path for said aircraft toward a fixed point, said apparatus comprising means connected to said energy receiving means for deriving from said received energy a control signal which is a function of the angular displacement of said aircraft from said path, and means responsive to said signal for communicating a control signal in a delayed manner to said automatic pilot.

26. In a control system for steering a craft relative to a course defined by a radio signal comprising two components of different characteristics on either side of said course, a receiver on said craft responsive to said signal and adapted to produce a direct current signal proportional in amplitude to the relative strengths of said components, means for gradually converting said direct current signal to a proportional alternating current signal, means operative in response to a change in polarity of the direct current signal resulting from displacement of said craft to one side or the other of said course, to shift the phase of said converted signal, and motor means operated by said converted signal, said motor means being responsive to said phase shift for determining the direction of operation of said motor means.

27. In a control system for steering a craft relative to a course defined by a radio signal comprising two components of different characteristics on either side of said course, a receiver on said craft responsive to said signal and adapted to produce a direct current signal proportional in amplitude to the relative strength of said components, means comprising a time delay device for gradually converting said direct current signal to a proportional alternating current signal, means operative in response to a change in polarity of the direct current signal resulting from displacement of said craft to one side or the other of said course, to shift the phase of said converted signal, and motor means operated by said converted signal, said motor means being responsive to said phase shift for determining the direction of operation of said motor means.

28. In a control system for steering a craft relative to a course defined by a radio signal comprising two components of different characteristics on either side of said course, a receiver on said craft responsive to said signal and adapted to produce a direct current signal proportional in amplitude to the relative strength of said components, means for gradually converting said direct current signal to a proportional alternating current signal, and motor means operated by said converted signal.

29. A control system for automtically steering an aircraft along an equal intensity path created by radio waves forming partially overlapping radiation patterns in space, comprising automatic pilot means for stabilizing said aircraft on an adjustable heading, and radio receiving means responsive to said radio waves for producing a control signal having an amplitude substantially proportional to the difference in intensity of said radiation patterns at said aircraft applied to said automatic pilot means, said automatic pilot means being gradually actuated by said receiving means for changing the heading of said aircraft by an angle proportional to the amplitude of said control signal to maintain said aircraft on said equal intensity path.

30. A control system for automatically steering an aircraft along an equal intensity path created by radio waves forming partially overlapping radiation patterns in space, comprising automatic pilot means for stabilizing said aircraft on an adjustable heading, and radio receiving means responsive to said radio waves for producing a control signal having an amplitude substantially proportional to the difference in intensity of said radiation patterns at said aircraft applied to said automatic pilot means, said automatic pilot means being periodically actuated by said receiving means when said signal exceeds a predetermined value for changing the heading of said aircraft by an angle proportional to the amplitude of said control signal to maintain said aircraft on said equal intensity path.

31. A control system for automatically steering an aircraft along an equal intensity path defined by partially overlapping radiation patterns, comprising automatic pilot means for stabilizing said aircraft on an adjustable heading, radio receiving means responsive to the relative intensities of said radiation patterns for developing a signal representative of lateral departure of said aircraft from said equal intensity path, and means slowly responsive to said receiving means actuating said automatic pilot means for adjusting the heading of said aircraft through an angle dependent upon the magnitude of said lateral departure to return said aircraft to said equal intensity path.

32. A control system for automatically directing an aircraft along a predetermined line of flight defined by directively radiated electro-magnetic energy, comprising automatic pilot means for stabilizing an axis of said aircraft, radio receiving means responsive to the intensity of said radiated energy for deriving a signal having an amplitude which is a measure of displacement of said aircraft from said predetermined line of flight, and means gradually responsive to said receiving means actuating said automatic pilot means for rotating said axis, through an angle dependent upon the amount of said displacement to direct said aircraft back to said predetermined line of flight.

33. A control system for automatically directing an aircraft along a predetermined line of flight defined by directively radiated electro-magnetic energy, comprising automatic pilot means for stabilizing an axis of said aircraft, radio receiving means responsive to the intensity of said radiated energy for deriving a signal having an amplitude which is a measure of displacement of said aircraft from said predetermined line of flight, means gradually responsive to said receiving means actuating said automatic pilot means for rotating said axis through an angle dependent upon the amount of said displacement to direct said aircraft back to said predetermined line of flight, and means responsive to said signal when the latter exceeds a predetermined value to discontinue operation of said gradually responsive means.

CORLES MELVIN PERKINS, Sr.
ALFRED BENNETT.

REFERENCES CITED

The following references are of record in the file of this patent:

UNITED STATES PATENTS

| Number | Name | Date |
|---|---|---|
| 1,958,258 | Alexanderson | May 8, 1934 |
| 1,999,047 | Hahnemann | Apr. 23, 1935 |
| 2,247,294 | Goble et al. | June 24, 1941 |
| 2,372,185 | Wittkuhns | Mar. 27, 1945 |
| 2,419,970 | Roe et al. | May 6, 1947 |
| 2,423,337 | Moseley | July 1, 1947 |
| 2,482,809 | Thompson | Sept. 27, 1949 |
| 2,484,819 | Ferrill | Oct. 18, 1949 |
| 2,484,862 | Streeter | Oct. 18, 1949 |

FOREIGN PATENTS

| Number | Country | Date |
|---|---|---|
| 888,812 | France | Sept. 13, 1943 |